(12) United States Patent
Kishida et al.

(10) Patent No.: US 6,670,911 B2
(45) Date of Patent: Dec. 30, 2003

(54) SCANNING RADAR SYSTEM

(75) Inventors: Masayuki Kishida, Kobe (JP); Hirofumi Higashida, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/203,361

(22) PCT Filed: Dec. 12, 2001

(86) PCT No.: PCT/JP01/10918
§ 371 (c)(1),
(2), (4) Date: Aug. 7, 2002

(87) PCT Pub. No.: WO02/48736
PCT Pub. Date: Jun. 20, 2002

(65) Prior Publication Data
US 2003/0011508 A1 Jan. 16, 2003

(30) Foreign Application Priority Data

Dec. 12, 2000 (JP) ........................... 2000-377841
Nov. 13, 2001 (JP) ........................... 2001-347750

(51) Int. Cl.$^7$ ................... G01S 13/00; B60T 7/16; B62D 1/24; B60Q 1/00
(52) U.S. Cl. ................... 342/70; 180/167; 340/435
(58) Field of Search ........................... 342/70, 69, 71; 340/435, 436; 180/167, 168, 169

(56) References Cited

U.S. PATENT DOCUMENTS

| | | | | |
|---|---|---|---|---|
| 5,023,617 A | | 6/1991 | Deering | |
| 5,745,070 A | * | 4/1998 | Yamada | 342/70 |
| 5,786,787 A | * | 7/1998 | Eriksson et al. | 342/70 |
| 5,818,355 A | * | 10/1998 | Shirai et al. | 340/903 |
| 5,955,967 A | * | 9/1999 | Yamada | 340/904 |
| 6,269,307 B1 | * | 7/2001 | Shinmura et al. | 701/301 |

FOREIGN PATENT DOCUMENTS

| | | |
|---|---|---|
| EP | 0 775 919 A2 | 5/1997 |
| EP | 0 825 454 A2 | 2/1998 |
| WO | WO 95/34830 | 12/1995 |

OTHER PUBLICATIONS

International Search Report of PCT/JP01/10918, dated Jan. 22, 2002.

* cited by examiner

Primary Examiner—Thomas H. Tarcza
Assistant Examiner—Brian Andrea
(74) Attorney, Agent, or Firm—Christie, Parker & Hale, LLP

(57) ABSTRACT

A scanning radar system accurately determines the lateral position of a target regardless of the heading of the target. The angle Ψ between the direction to the target and the heading of the target is calculated using equation $$\Psi = \theta - \tan^{-1}\{d \cos \theta / (R - d \sin \theta)\}$$

and a correction value ΔX for the lateral position X is determined based on the angle Ψ.

13 Claims, 5 Drawing Sheets

SCANNING RADAR SYSTEM

CROSS-REFERENCE TO RELATED APPLICATION

This application claims priority of International application number PCT/JP01/10918, filed Dec. 12, 2001, which in turn claims priority of Japanese application number 2000-377841, filed Dec. 12, 2000, and Japanese application number 2001-347750, filed Nov. 13, 2001.

TECHNICAL FIELD

The present invention relates to a scanning radar system that transmits radio waves while scanning the projection direction thereof, that determines the lateral position of a target based on the strength of a reflected wave returned from the target and, more particularly, to a scanning radar system that measures the lateral position of a target as well as the distance and relative velocity thereof for vehicle-to-vehicle distance control.

BACKGROUND ART

A vehicle equipped with an FM-CW radar can measure the distance and relative velocity of a target located ahead of the vehicle. If the distance, for example, to a vehicle traveling ahead is to be properly controlled based on these measured values, the lateral position of the target located ahead must be determined.

A scanning radar system, as shown in FIG. 1(b), transmits a radiowave while scanning the projection direction thereof, and determines the lateral position of a target based on the direction in which the target is located, i.e., the direction in which the strength of the reflected wave from the target is the highest.

According to this method, the lateral position of the target can be determined accurately, provided that there is no displacement between the direction to which the target is located when viewed from the radar-equipped vehicle (the direction to the target) and the direction in which the target is traveling (the heading of the target).

However, if there is a displacement between the direction to the target and the heading of the target, the lateral position of the target cannot be determined accurately. For example, in the case shown in FIG. 1(a) or 1(c), as the power of the reflected wave is the highest at one edge of the target, the lateral position of the target cannot be estimated accurately.

DISCLOSURE OF THE INVENTION

Accordingly, it is an object of the present invention to provide a scanning radar system that can accurately determine the lateral position of a target even when the heading of the target is displaced from the direction to the target.

According to the present invention, there is provided a scanning radar system comprising: lateral position determining means for determining a lateral position X of a target, based on the strength of a reflected wave returned from the target when radio waves are projected while scanning the projection direction thereof; means for determining an angle $\Psi$ between a direction to the target and a heading of the target; means for determining a correction value $\Delta X$ for the lateral position based on the angle $\Psi$; and means for correcting the lateral position X by the correction value $\Delta X$.

Preferably, the angle $\Psi$ determining means determines the angle $\Psi$, based on a turning radius R, a distance d to the target, and an angle $\theta$ between the direction to the target and the heading of a vehicle equipped with the radar system, by calculating equation $$\Psi = \theta - \tan^{-1}\{d \cos \theta/(R - d \sin \theta)\}$$

BEST MODE FOR CARRYING OUT THE INVENTION

Figure 1:
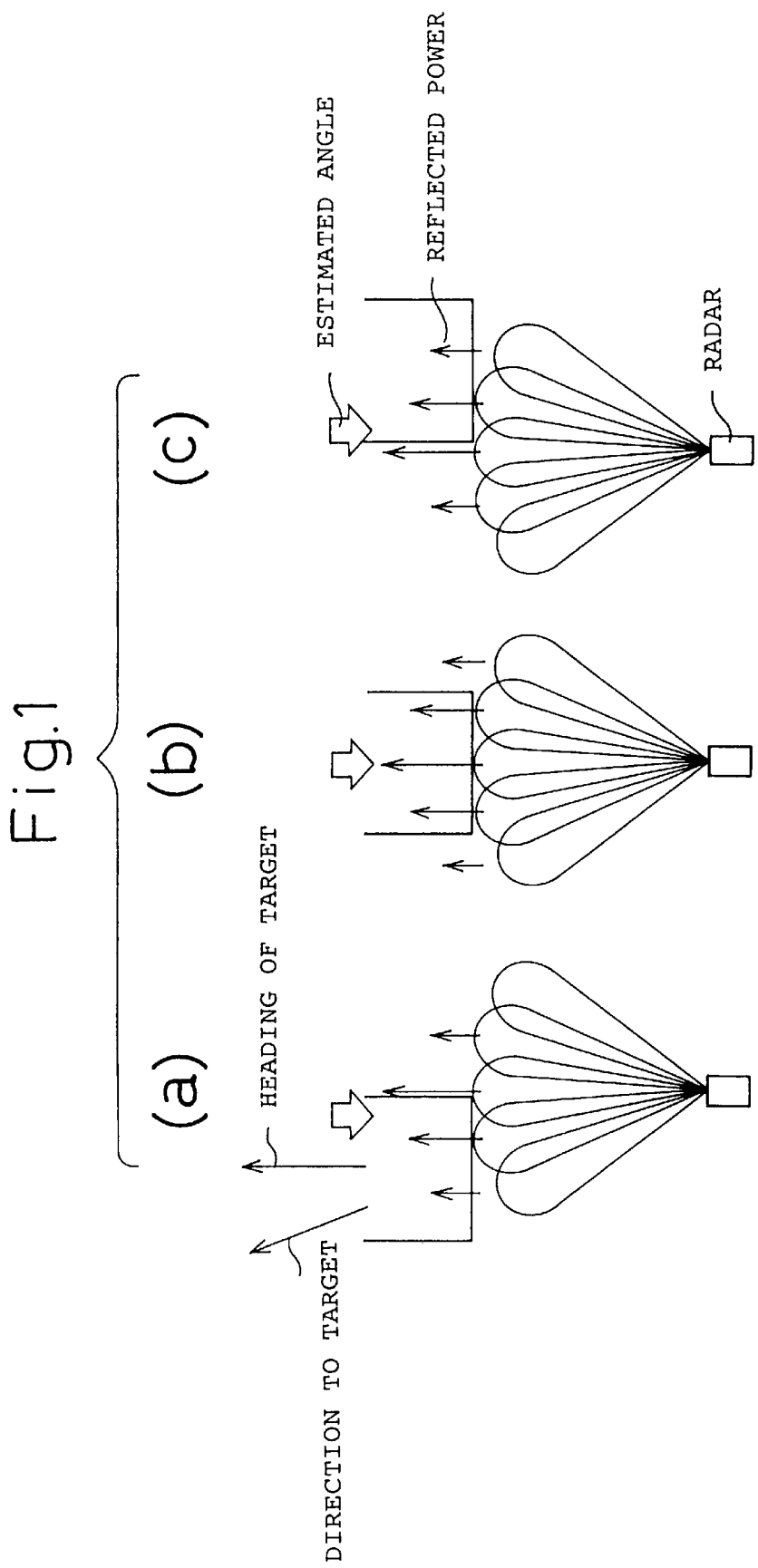
FIG. 1 is a diagram for explaining a problem in determining the lateral position.
Figure 2:
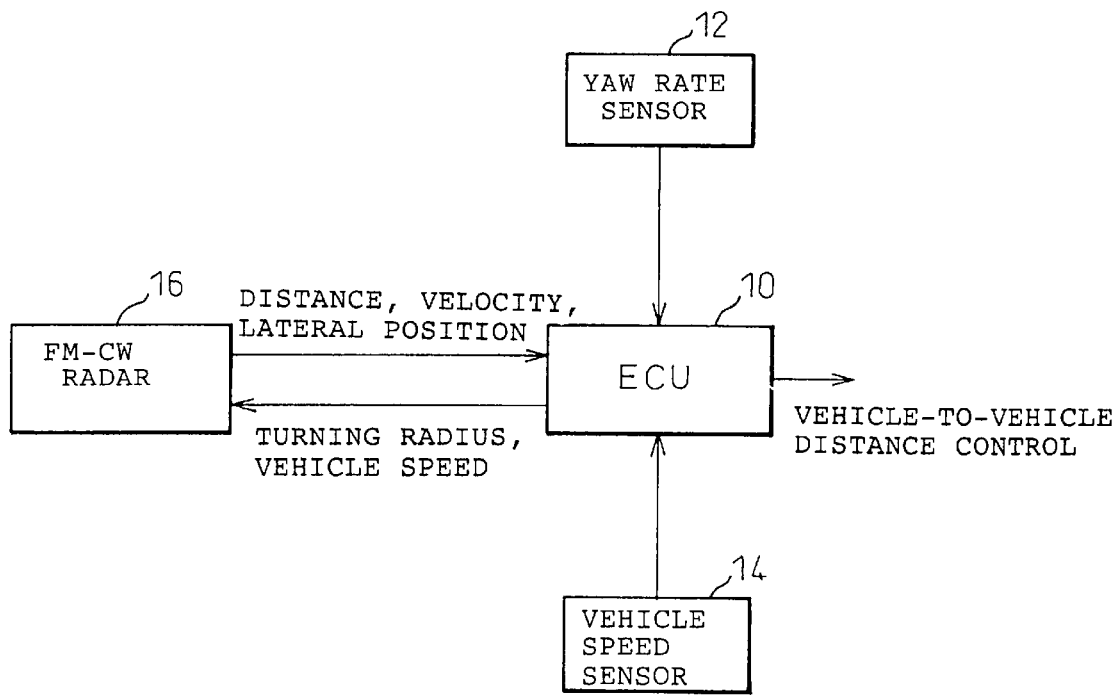
FIG. 2 is a block diagram showing the configuration of a vehicle-mounted radar system according to one embodiment of the present invention.

FIG. 2 shows the configuration of a vehicle-mounted millimeter-wave scanning radar system as one embodiment of a scanning radar system according to the present invention.

In FIG. 2, an ECU 10 calculates the turning radius R of the radar-equipped vehicle based on a signal from a yaw rate sensor 12 and a signal from a vehicle speed sensor 14, and supplies the result to an FM-CW radar 16 together with vehicle speed data. The turning radius R can also be calculated by using data from a steering sensor instead of the data from the yaw rate sensor 12. The FM-CW radar 16 projects radio waves, in the millimeter wave region and frequency modulated by a triangular wave, in the forward direction of the vehicle and calculates the distance and relative velocity of a target located ahead. Further, the FM-CW radar 16 scans the projection direction of the radio waves, as earlier described, and calculates an estimated value X[m] for the lateral position of the target from the power distribution of the reflected wave. It also calculates a correction value $\Delta X$ for the lateral position based on the data of the turning radius R, etc. supplied from the ECU 10, and supplies the corrected lateral position X to the ECU 10 together with the distance and relative velocity data. Based on these data, the ECU 10 generates and outputs a control signal for maintaining a constant distance from the vehicle traveling ahead.

Figure 3:
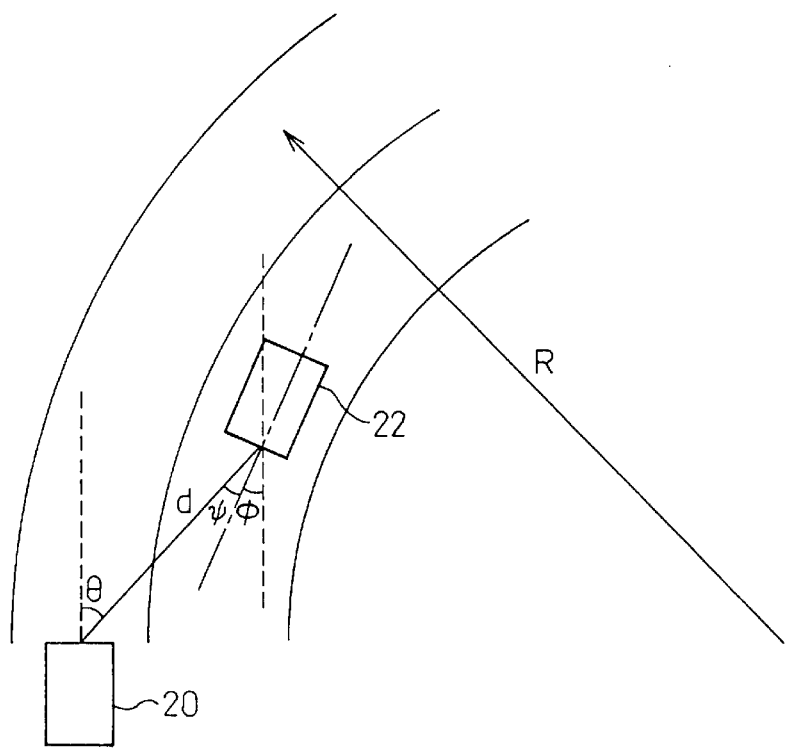
FIG. 3 is a diagram for explaining a method of calculating the angle $\Psi$.
Figure 4:
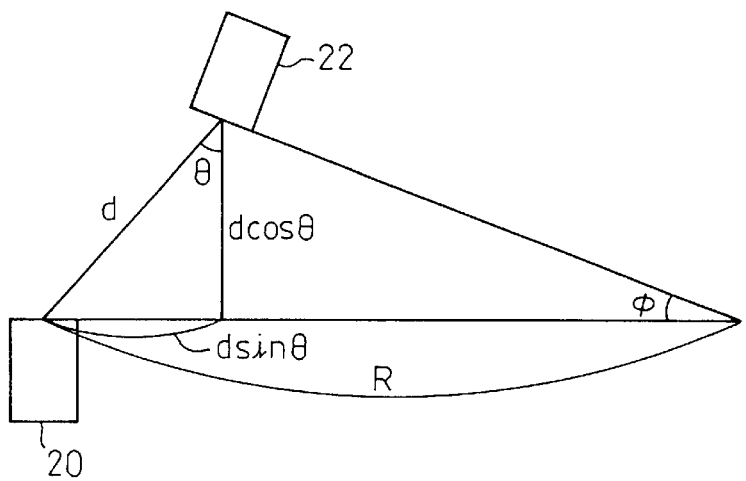
FIG. 4 is a diagram for explaining a method of calculating the angle $\Psi$.

FIGS. 3 and 4 show the principles of methods for calculating the lateral position X and the correction value $\Delta X$. In FIGS. 3 and 4, R is the turning radius of the radar-equipped vehicle 20, d is the distance to the target 22, $\Psi$ is the angle between the direction to which the target 22 is located when viewed from the vehicle 20 (the direction to the target) and the direction in which the target 22 is traveling (the heading of the target), and $\phi$ is the angle between the heading of the vehicle 20 and the heading of the target 22.

As can be seen from FIG. 4, the angle φ can be calculated as $$\phi = \tan^{-1}\{d \cos \theta/(R - d \sin \theta)\}$$

Hence, the angle Ψ is given as $$\Psi = \theta - \phi$$

Figure 5:
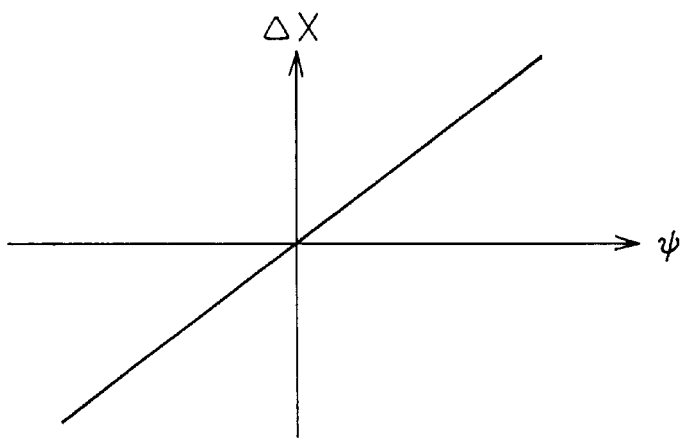
FIG. 5 is a diagram for explaining how the correction value $\Delta X$ is calculated from the angle $\Psi$.

Since the angle Ψ represents the displacement between the direction of the radiowave projected to the target and the heading of the target, the correction value ΔX is determined in accordance with a linear function passing through the origin, such as shown in FIG. 5. Based on the thus determined ΔX, the lateral position X is corrected as $$X = X + \Delta X$$

These operations are performed using software, for example, by incorporating a CPU in the FM-CW radar.

Figure 6:
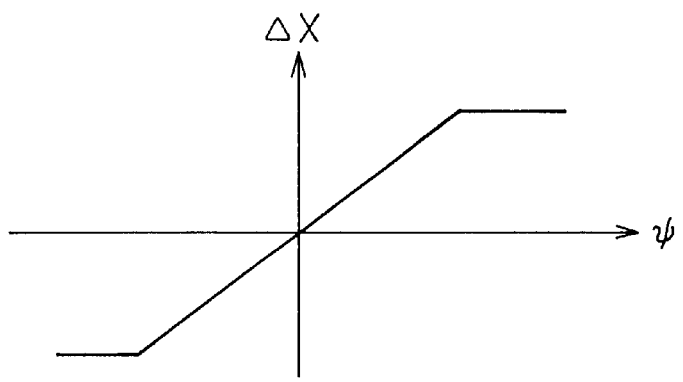
FIG. 6 is a diagram showing a second example explaining how the correction value $\Delta X$ is calculated from the angle $\Psi$.
Figure 7:
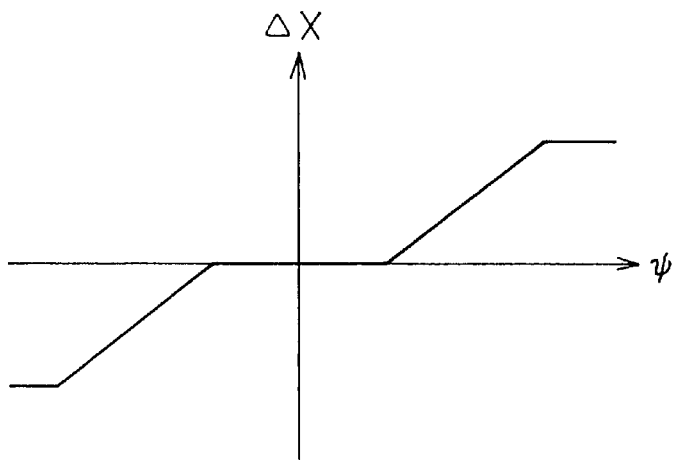
FIG. 7 is a diagram showing a third example explaining how the correction value $\Delta X$ is calculated from the angle $\Psi$.
Figure 8:
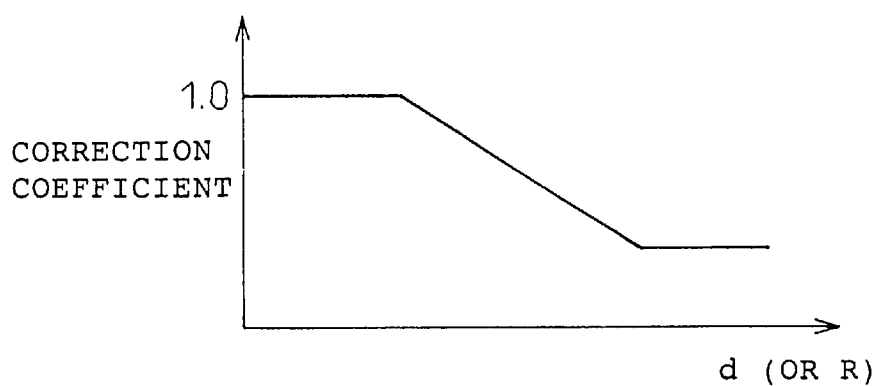
FIG. 8 is a diagram showing a first example explaining how $\Delta X$ is corrected according to the distance d or turning radius R.
Figure 9:
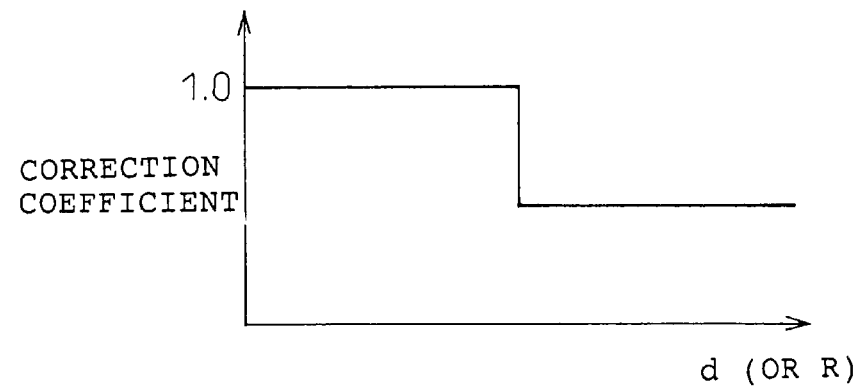
FIG. 9 is a diagram showing a second example explaining how $\Delta X$ is corrected according to the distance d or turning radius R.

In the function shown in FIG. 5, ΔX increases with increasing Ψ, but it is desirable that an upper bound be placed on the absolute value of ΔX as shown in FIG. 6, for reasons such as an actual vehicle width being finite. It is further desirable that a dead zone where ΔX is maintained at 0 be provided centered about angle 0 as shown in FIG. 7, because it is not desirable for the lateral position X to vary for small values of Ψ due to the effect of noise. Further, when the distance to the target is large, the correction amount ΔX should become small; therefore, ΔX should be reduced in order to avoid the effect of noise. In this case, ΔX is multiplied by a correction coefficient that becomes smaller than 1.0 when the distance d increases, as shown by the function of FIG. 8 or 9, and the result is taken as ΔX. Likewise, when the turning radius R is large, the correction coefficient is reduced in order to avoid the effect of noise.

Since the thus calculated ΔX contains noise, it is desirable to reduce the effect of noise by correcting X by using, for example, $\Delta X_n$ calculated as $$\Delta X_n = (\Delta X_{n-1} \times 3 + \Delta X)/4$$

rather than directly correcting X by using ΔX. Further, when it is judged, from the uncorrected lateral position X, that the target is traveling in the same lane as the radar-equipped vehicle, the amount of correction is reduced by multiplying ΔX, for example, by 0.7. When the amount of change of the turning radius R within a unit time becomes greater than a predetermined value as a result of the steering action of the driver, the correction amount ΔX is set to 0 because it is not desirable to correct X by responding to the change. No correction is applied to the lateral position for a target judged to be a stationary object. Further, learning of a neutral position is performed in order to cancel the drift of the steering sensor (or the yaw rate sensor) based on which the turning radius R is calculated; here, correction of the lateral position X should not be performed until the learning is done.

The calculation of the correction value ΔX has been described above, but it will be understood that, depending on the target, it is desirable not to correct the lateral position if it is found for some other reason that correction of the lateral position is not necessary, even when the calculated ΔX value is not 0.

More specifically, for a target that matches any one of the following conditions, no correction is applied because the correction is considered unnecessary even if the calculated ΔX value is not 0.

(1) A target that is judged, from the uncorrected lateral position X, to be traveling in the same lane as the radar-equipped vehicle.

(2) A target from which the power (peak strength) is smaller than a predetermined fixed reference value or a reference value that varies as a function of the distance. The reason is that, in the case of a small target such as a bicycle, the reflected wave (peak) is less likely to be distributed in the angular direction.

(3) A target from which the reflected wave (peak) is not distributed in the angular direction but exhibits a peak in only one direction.

(4) A target that has been judged to be an object, such as a large truck, physically having a plurality of reflecting points, and for which processing has been performed to take the average over a plurality of reflected waves (peaks) giving similar distances, angles, and relative velocities. The reason is that the angle is already corrected by the averaging operation and, if a further correction were applied, an overcorrection would result.

For any target for which a correction has ever been made by determining that it does not match any one of the above conditions (1) to (4), it is desirable to always treat such a target as a target that causes an angular displacement and apply a correction, even if the target is thereafter judged to match any one of the conditions (1) to 4).

As described above, according to the present invention, there is provided a scanning radar system that can accurately determine the lateral position of a target regardless of the heading of the target.

What is claimed is:

1. A scanning radar system comprising:

lateral position determining means for determining a lateral position X of a target, based on the strength of a reflected wave returned from said target when a radiowave was projected while scanning the projection direction thereof;

means for determining an angle Ψ between a direction to said target and a heading of said target;

means for determining a correction value ΔX for said lateral position based on said angle Ψ; and means for correcting said lateral position X by said correction value ΔX.

2. A scanning radar system according to claim 1, wherein said angle Ψ determining means determines said angle Ψ, based on a turning radius R, a distance d to said target, and an angle θ between the direction to said target and the heading of a vehicle equipped with said radar system, by resolving the equation $$\Psi\theta - \tan^{-1}\{d \cos \theta/(R - d \sin \theta)\}$$

3. A scanning radar system according to claim 1 or 2, wherein said correction value determining means determines said correction value ΔX in such a manner that an upper bound value and a lower bound value are provided for said correction value ΔX.

4. A scanning radar system according to claim 1, wherein said correction value determining means determines said correction value ΔX in such a manner that said correction value ΔX has a dead zone where said correction value ΔX does not change even if said angle Ψ changes within a range including 0.

5. A scanning radar system according to claim 1 wherein, when the distance d to said target is large, said correction value determining means takes a smaller value as said correction value $\Delta X$ than when the distance to said target is small.

6. A scanning radar system according to claim 1 wherein, when said turning radius R is large, said correction value determining means takes a smaller value as said correction value $\Delta X$ than when said turning radius is small.

7. A scanning radar system according to claim 1 wherein, when said target is judged to be traveling in the same lane as the radar-equipped vehicle, said correction value determining means takes a smaller value as said correction value $\Delta X$ than said determined value of $\Delta X$.

8. A scanning radar system according to claim 1 wherein, when the amount of change of said turning radius R within a unit time is greater than a predetermined value, said correction value determining means sets said correction value $\Delta X$ to 0.

9. A scanning radar system according to claim 1, further comprising target discriminating means for determining, for each individual target, whether correction of said lateral position is necessary or not, and wherein, for any target for which said target discriminating means has determined that correction of said lateral position is not necessary, said lateral position correcting means does not correct said lateral position regardless of said determined correction value $\Delta X$.

10. A scanning radar system according to claim 9 wherein, for any target that has ever been determined as needing a correction to said lateral position, said lateral position correcting means always correct said lateral position.

11. A scanning radar system according to claim 9 or 10 wherein, for a target that is judged, from the uncorrected lateral position X, to be traveling in the same lane as the radar-equipped vehicle, said target discriminating means determines that correction of said lateral position is not necessary.

12. A scanning radar system according to claim 9 wherein, for a target that is judged to substantially not spread in an angular direction, said target discriminating means determines that correction of said lateral position is not necessary.

13. A scanning radar system according to claim 9 wherein, for a target for which an average angle has been taken over a plurality of reflections, said target discriminating means determines that correction of said lateral position is not necessary.

* * * * *